Jan. 9, 1940.  R. P. LEAVITT ET AL  2,186,610
LENS HOOD
Filed Dec. 31, 1937
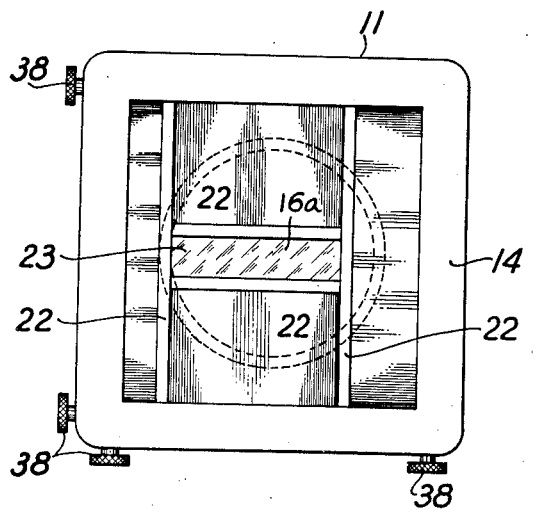
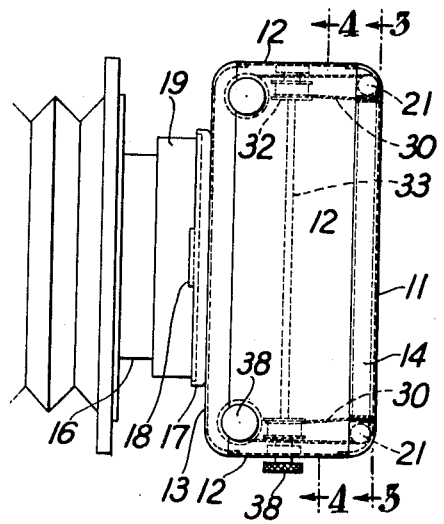
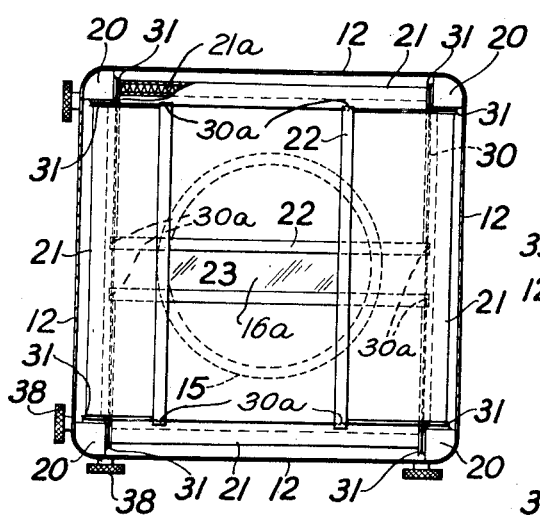
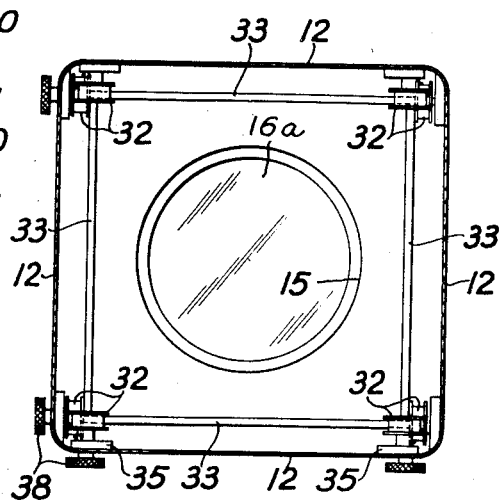
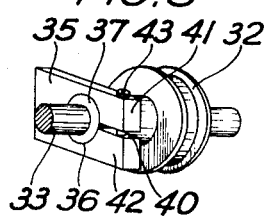
Roger P. Leavitt
Joseph Stiles Beggs
INVENTORS
BY
ATTORNEY.

Patented Jan. 9, 1940

2,186,610

UNITED STATES PATENT OFFICE 2,186,610

LENS HOOD

Roger P. Leavitt and Joseph S. Beggs, Rochester, N. Y., assignors to Eastman Kodak Company, Rochester, N. Y., a corporation of New Jersey Application December 31, 1937, Serial No. 182,823

3 Claims. (Cl. 95—36)

This invention relates to photography, and more particularly to a lens hood adapted to be detachably mounted on the lens barrel of a camera.

An object of the invention is the provision of a lens hood which permits the making of multiple exposures on a single film. These multiple exposures are known in the art as Photo-Montage.

Another object of the invention is the provision of a lens hood by which light from only a portion of the subject may be recorded on the sensitized film.

A further object of the invention is the provision of a lens hood, the opening of which may be readily and easily varied in size as well as position.

A further object is the provision of a lens hood having a plurality of sliding members or curtains for forming the light aperture therein. These curtains may be accurately positioned and positively retained in adjustment, and yet may be quickly moved to vary both the position and the size of the light aperture.

Yet another object of the invention is the provision of a lens hood of this kind which is easy to manipulate, positive and accurate in its action, and easily secured to the lens barrel of a camera.

Still another object of the invention is the provision of such a lens hood which is adapted to be used with cameras now on the market.

To these and other ends, the invention resides in certain improvements and combinations of parts all as will be hereinafter more fully described, the novel features being pointed out in the claims at the end of the specification.

In the drawing:

Fig. 1 is a front elevation view of a lens hood constructed in accordance with the preferred embodiment of the invention, showing the curtains arranged to provide a narrow and off-center light aperture;

Fig. 2 is a side elevation view of the lens hood illustrated in Fig. 1, showing the arrangement of the parts of a hood constructed in accordance with the present invention, and the manner of detachably securing the hood to the lens barrel of a camera;

Fig. 3 is a vertical sectional view taken substantially on the line 3—3 of Fig. 2 showing the arrangement of the curtains and the supporting rollers therefor;

Fig. 4 is a vertical sectional view taken substantially on the line 4—4 of Fig. 2, showing the arrangement of the winding drum for drawing the curtain into light obstructing position over the front aperture of the lens hood; and Fig. 5 is a perspective view of a portion of one of the winding shafts and drum, showing the arrangement for frictionally maintaining the shaft in adjusted position.

Similar reference numerals throughout the several views indicate the same parts.

The present invention is embodied, in the present instance, in a lens hood arranged to be positioned in front of the objective lens of a camera, to permit a plurality of blended and overlapping exposures to be made on a single sheet of sensitized material such as photographic film.

To secure this result, the lens hood is provided with a plurality of sliding members, such as curtains, which may be adjusted to provide an exposure opening of sufficient size to expose only the desired portion of the sensitized film positioned in the focal plane of the camera. After exposure is thus made, the curtains are again adjusted to provide an exposure opening so positioned to expose another desired part of the sensitized strip. This method is continued until all, or the desired portions of the strip, have been separately exposed. As the curtains on the lens hood are adjacent the camera lens, the marginal edges of each exposure are not clear cut, but are blended into the adjacent exposures. Such an arrangement provides a sensitized strip formed with a plurality of blended exposures which are known in the art as a Photo-Montage exposure.

Referring now to the drawing, there is shown a lens hood constructed in accordance with the preferred embodiment of the invention. This hood comprises a hollow rectangular substantially rigid member 11, preferably metal, which is cast or otherwise formed, to provide sides 12, a back 13, and the front 14. The back 13 is formed with a circular opening 15 through which the lens barrel 16 of the camera may project, as clearly shown in Fig. 2. The back is also provided with a flange 17 carrying a bayonet lock 18 adapted to engage a complementary portion, not shown, on a collar 19 secured to the lens barrel 16, whereby the lens hood may be detachably secured to the lens barrel, as clearly indicated in Fig. 2. The lens hood illustrated in the present embodiment is particularly designed for use with cameras of the "view" or "commercial" type. It is contemplated, however, that such a hood may be adapted for use with a wide variety of cameras without departing from the spirit of the invention or the scope of the appended claims.

The member 11 is formed, adjacent the front 14 thereof, with corner bearings 20 each of which is arranged to hold and support an end of two adjacent rollers 21, as clearly illustrated in Fig. 3. Each of these rollers is of spring type, and has mounted thereon a curtain 22 so that the entire construction resembles an ordinary window shade and roller. In the preferred embodiment, these curtains are preferably of fabric material, although it is contemplated that thin metal may be used if desired. The springs 21A of the rollers 21 tend to rewind the curtains 22 thereon when the latter are drawn out, much in the manner of the ordinary window shade. As the spring arrangements for all the rollers 21 are the same, only one is shown.

It is apparent from inspection of Figs. 1 and 3, that when the side curtains are drawn out or toward each other, the vertical dimension of the light aperture 23 in the front 14 may be varied both as to size and location. It is also evident that the horizontal size and position of the aperture may be adjusted by drawing the upper and lower curtains 22, as clearly illustrated in Figs. 1 and 2.

In taking Photo-Montage exposures, the film or plate holder is first removed from the camera, and the object to be photographed is viewed on the camera ground glass focusing screen, not shown, which is positioned in the focal plane of the lens 16a, as is well known. As only a portion of the film in the holder is to be exposed, the curtains 22 are adjusted to block off part of the lens 16a so as to provide an image of the desired size and suitably positioned on the selected portion of the ground glass screen. The holder is then placed in the camera, and the positioned image exposes a portion only of the film or plate. After the exposure is made the holder is again removed from the camera. An image of the same, or different, subject is then projected on another selected portion of the focusing screen by adjusting the curtains 22 to secure an image which is suitably positioned and of the proper size. After a second image of the desired size and location is thus secured on the ground glass, the holder is again placed in the camera, and another portion of the film strip is exposed.

This procedure of adjusting the curtains 22 and successively exposing different portions of the film is continued until the entire film, or the desired portions thereof, have been exposed. By means of this arrangement, a series of images of the same or different subjects are secured on a single film. However, as the curtains 22 are adjacent the lens, the curtains act somewhat in the manner of vignetters so that the various images are not separated or demarcated by sharp distinct lines, but rather blend into each other. Such a group of blended exposures on a single negative is known in the art as a Photo-Montage exposure.

In order to accomplish the various adjustments, the present invention provides a novel arrangement for independently drawing each curtain 22 so that not only the size but also the position of the opening formed by the curtains may be easily and quickly varied to secure the desired multiple exposure of the film. After the curtains are positioned, they are positively held to insure the exposure of the selected section of the film. As the drawing and holding means for the four curtains are identical, only one will be herein described. Similar parts of the different curtain structures will be designated by the same numerals.

A pair of thin strands or wires 30 are secured at 30A to the free end of each curtain 22 adjacent the edges thereof, as clearly shown in Fig. 3. These strands or wires extend over a pair of grooved pulleys 31 loosely mounted on the opposite roller 21. For example, the wires 30 of the upper curtain extend over the pulleys 31 mounted on the lower curtain roller 21, and the left curtain wires run over pulleys 31 loosely mounted on the right curtain roller, and so on.

The ends of each pair of wires 30 are connected to a pair of drums 32 secured to and rotatable as a unit with a shaft 33 which is journaled in the sides 12 of the member 11 adjacent the back 13 thereof, as shown in Fig. 2. It is evident that when each shaft 33 is rotated in one direction, the wires 30 will be wound onto the drums 32, thus drawing the curtain 22 from the roller 21 to reduce the size of and to position the image on the ground glass focusing screen. This drawing out of the curtain will thus tension the spring 21A positioned within the roller 21, as is well known. When, however, the shaft 33 is rotated in the opposite direction, the spring roller 21 will rewind the curtain 22 thereonto so as to increase the size of and to position the image on the ground glass focusing screen.

When each curtain is adjusted to provide a light aperature of proper size and location, it is essential that the aperture be maintained until the exposure is made. To this end, the present invention provides means for frictionally holding the drums 32 to maintain the curtain 22 in adjusted position. This frictional means is preferably in the form of a thin, flat fiber member 35 having a central opening 36 into which a hub 37 of the drum 32 projects. This frictional member grips the hub 37 to prevent accidental rotation of the shaft 33 and drums 32. Each shaft 33 may, however, be rotated against the frictional resistance of the member 35 by means of a small hand knob 38 secured to one end of the shaft. When, however, the curtain 22 has been adusted, the fiber member 35 securely holds the shaft 33 against rotation, thus maintaining the desired adjustment of the curtain 22. The members 35 thus constitute, in effect, brakes which hold the shafts 33 and prevent the spring actuated means 21 from winding the curtains 22 thereon. Each member 35 is preferably split, as shown at 40 in Fig. 5, and the two portions 41 and 42 thereof may be drawn together or separated by means of a screw 43 to take up for wear or to adjust the frictional drag on the hub 37, as will be apparent from inspection of Fig. 5.

It is thus apparent from the above description that the curtains may be separately and independently adjusted by turning the proper knob 38, thus rotating the shaft 33 and the drums 32 mounted thereon. When the drums 32 are rotated in one direction, the wires 30 are wound thereon to unroll the curtain 22 from the roller 21. The wires 30 being guided over the groove pulleys 31 on the opposite roller 21. Rotation of the drums 32 in the opposite direction, however, unwinds the wires 30 therefrom, and permits the roller 21, under the action of the spring, to rewind the curtain 22 thereon, to increase the size and/or position of the light aperture formed in the front of the body portion 11. When the curtain is properly adjusted, it is so held by reason of the gripping action of the fiber member 35 on the hub 37, thus positively maintaining the curtain in position, yet enabling the curtain to be easily and quickly moved to a new position after the exposure has been made. By means of this arrangement, the size and/or location of the light aperture may be adjusted so that the different portions of the sensitized surface may be separately exposed to provide the desired Photo-Montage exposure.

While one embodiment of the invention has been disclosed, it is to be understood that the inventive idea may be carried out in a number of ways. This application is, therefore, not to be limited to the precise details described, but is intended to cover all variations and modifications thereof falling within the spirit of the invention and the scope of the appended claims.

We claim:

1. A lens hood for cameras comprising, in combination, a body portion having side walls and a front wall formed with a rectangular opening, means for detachably securing said body portion to a lens barrel of said camera, spring actuated rollers rotatably mounted on said walls and extending across said portion adjacent the edges of said opening and normal to the optical axis of said lens barrel, curtains mounted on said rollers and arranged to be positioned across said opening to form a light aperture which may be varied in size or location, the springs of said rollers tending to move said curtains in one direction to enlarge said aperture, shafts extending across said portion behind and substantially parallel to said rollers and having the ends rotatably mounted in said sides, a pair of wind-up drums secured to each of said shafts adjacent the ends thereof, a pair of wind-up cords for each of said curtains, each of said cords having one end thereof secured to the free end of one of said curtains adjacent a marginal edge thereof and the other end fastened to one of said drums, guide pulleys loosely mounted on the ends of each of said rollers, the pulleys on each roller serving to guide the cords secured to an opposite curtain, and means for separately rotating each of said shafts to wind the cords onto said drums to draw said curtains across said opening to reduce the size or location of said aperture.

2. A lens hood for cameras comprising, in combination, a body portion having side walls and a front wall formed with a rectangular opening, means for detachably securing said body portion to a lens barrel of said camera, spring actuated rollers rotatably mounted on said walls and extending across said portion adjacent the edges of said opening and normal to the optical axis of said lens barrel, curtains mounted on said rollers and arranged to be positioned across said opening to form a light aperture which may be varied in size or location, the springs of said rollers tending to move said curtains in one direction to enlarge said aperture, shafts extending across said portion behind and substantially parallel to said rollers and having the ends rotatably mounted in said sides, a pair of wind-up drums secured to each of said shafts adjacent the ends thereof, a pair of wind-up cords for each of said curtains, each of said cords having one end thereof secured to the free end of one of said curtains adjacent a marginal edge thereof and the other end fastened to one of said drums, guide pulleys loosely mounted on the ends of each of said rollers, the pulleys on each roller serving to guide the cords secured to an opposite curtain, means for separately rotating each of said shafts to wind the cords onto said drums to draw said curtains across said opening to reduce the size or location of said aperture, and separate friction means mounted on said body portion and engaging each of said drums to independently maintain said curtains in adjusted position.

3. A lens hood for cameras comprising, in combination, a body portion having side walls and a front wall formed with a rectangular opening, means for detachably securing said body portion to a lens barrel of said camera, spring actuated rollers rotatably mounted on said walls and extending across said portion adjacent the edges of said opening and normal to the optical axis of said lens barrel, curtains mounted on said rollers and arranged to be positioned across said opening to form a light aperture which may be varied in size or location, the springs of said rollers tending to move said curtains in one direction to enlarge said aperture, shafts extending across said portion behind and substantially parallel to said rollers and having the ends rotatably mounted in said sides, a pair of wind-up drums secured to each of said shafts adjacent the ends thereof, a pair of wind-up cords for each of said curtains, each of said cords having one end thereof secured to the free end of one of said curtains adjacent a marginal edge thereof and the other end fastened to one of said drums, guide pulleys loosely mounted on the ends of each of said rollers, the pulleys on each roller serving to guide the cords secured to an opposite curtain, means for separately rotating each of said shafts to wind the cords onto said drums to draw said curtains across said opening to reduce the size or location of said aperture, a laterally extending hub formed on each of said drums, and a bifurcated brake member engaging said hub to frictionally hold said drum to maintain said curtains in adjusted position.

ROGER P. LEAVITT.
JOSEPH S. BEGGS.